A. J. WILLS, DEC'D.
M. B. WILLS, EXECUTRIX.
DEVICE FOR MOLDING SHEET RUBBER.
APPLICATION FILED MAR. 29, 1916.
1,281,462.
Patented Oct. 15, 1918.
2 SHEETS—SHEET 1.
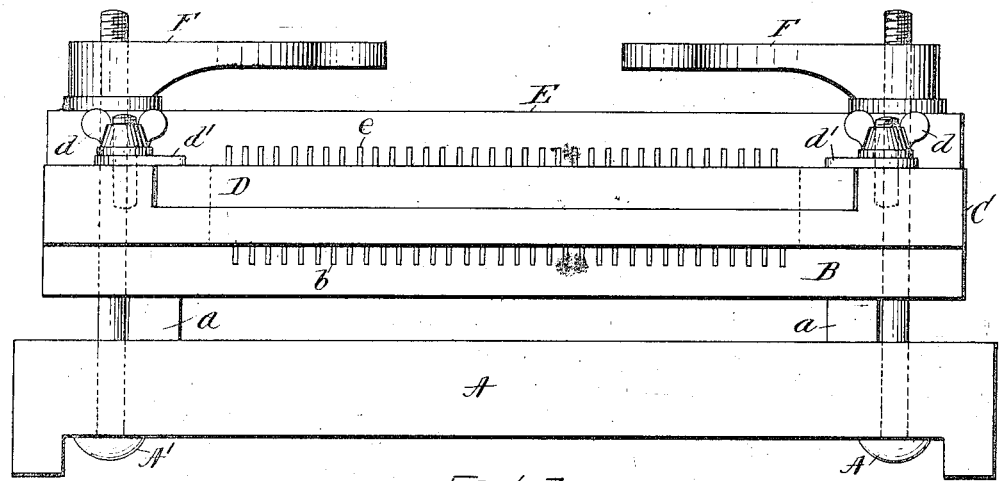
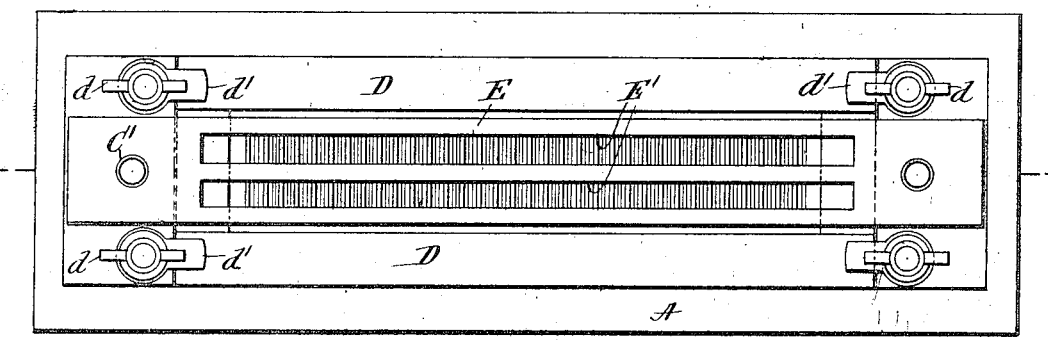
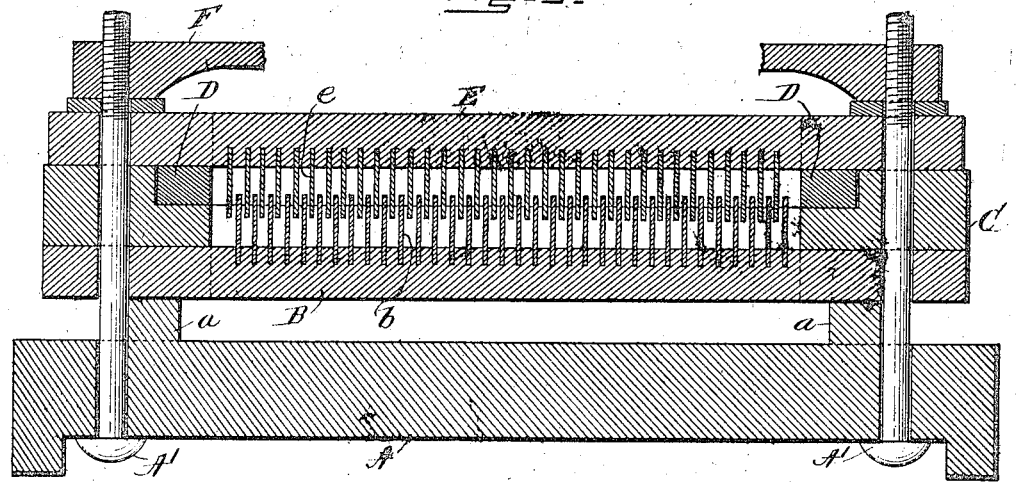

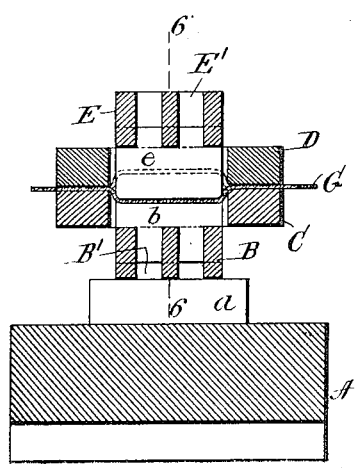 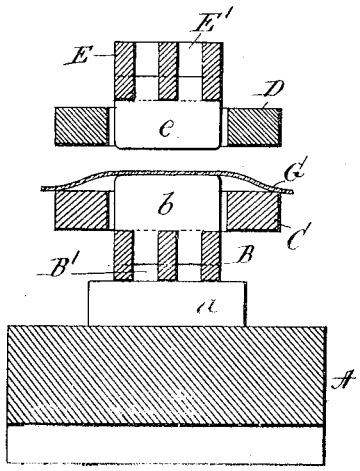
Fig. 4.  Fig. 5.
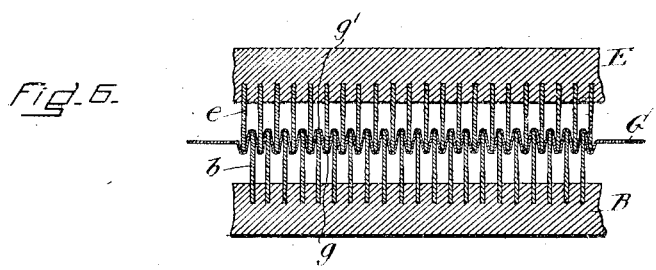
Fig. 6.
Fig. 7.
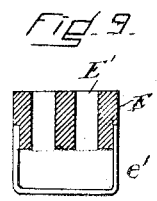
Fig. 9.
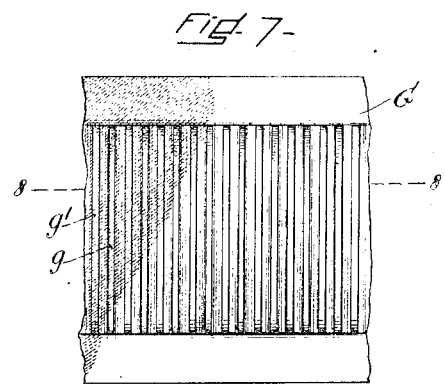
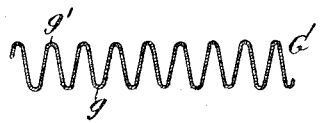
Fig. 8.

UNITED STATES PATENT OFFICE.

ARTHUR J. WILLS, OF BROOKFIELD, MASSACHUSETTS; MABEL BARTON WILLS EXECUTRIX OF SAID ARTHUR J. WILLS, DECEASED.

DEVICE FOR MOLDING SHEET-RUBBER.

1,281,462.     Specification of Letters Patent.     Patented Oct. 15, 1918.

Application filed March 29, 1916. Serial No. 87,650.

*To all whom it may concern:*

Be it known that I, ARTHUR J. WILLS, of Brookfield, in the county of Worcester and State of Massachusetts, a citizen of the United States, have invented a new and useful Device for Molding Sheet-Rubber, of which the following is a specification.

My invention relates to a method of sustaining or fixing sheet rubber in shapes during the process of vulcanizing, which gives a new product, and mechanism therefor, the mechanism being adapted to shape sheets or strips of rubber by stretching them as a whole or in part prior to and during vulcanization, and it is especially designed for use in what is known as the "cold process" of vulcanization, the mold being of such character as to enable the agent which causes the vulcanization to reach substantially the whole of both surfaces of the rubber, and the product being one in which the rubber has been vulcanized in distorted or stretched form. My invention may be adapted for use in molding or giving various shapes to rubber sheets or other rubber articles. In practice the form of my invention shown in the drawings is useful in smocking, crimping, plaiting or shirring strips or sheets of rubber of a kind especially adapted to be used for trimming or ornamentation for rubber apparel, bathing caps or the like, but I do not mean to limit myself to such use, nor to the production of the exact pattern of crimping shown in the drawings, as the die members of the machine may be variously shaped, for example, to reproduce letters, Etruscan borders, concentric circles, rosettes, or other forms of ornamentation, my invention relating not to the particular shape of the dies by which the rubber or rubber compound is sustained in shapes during vulcanization, but to the construction and arrangement of the shaping dies whereby substantially the entire surface of the material may be acted upon by the vulcanizing agent.

My invention will be understood by reference to the drawings, in which one form of my mechanism is shown.

Figure 1 is a side elevation of a simple form of mold embodying my invention,

Fig. 2 being a top view, the compressing handles being removed.

Fig. 3 is a section on line 3—3 of Fig. 2.

Fig. 4 is a cross section showing the operation of the mold,

Fig. 5 being a similar section, the dies being in separated position, showing the manner in which the material is put in place in the mold, Fig. 6 is a section on the line 6—6 of Fig. 4, showing the parts in operative position.

Fig. 7 is a plan view of the material shaped by this form of die.

Fig. 8 is a horizontal section thereof, and

Fig. 9 is another form of die.

A is the base carrying two blocks $a$, $a$, or other means for lifting the lower die B above the base to provide an air or gas space between the two.

The lower die B comprises a skeleton plate having projecting from its upper surface a series of die members $b$. These die members may be set into suitable grooves in the plate, may be cast integral therewith, or may be otherwise attached thereto as is most convenient. Two bolts $A^1$ pass up through the base plate A and the die plate B to hold the die members in proper position. Other means may be employed for the purpose, if desired. C is a holding frame in which the material is held and may or may not be used as may be expedient according to circumstances. As shown it is recessed on its upper side to receive the members D of a clamp between which and the frame C the side as well as the end edges of the material to be acted upon are clamped during the shaping and vulcanizing process. This clamp D may be a single rectangular frame or it may be made as shown of four pieces, and these parts, if used, may be attached to the frame C in any convenient way as by ordinary screws or by thumb screws $d$ as shown in the drawings, in which latter case, as a matter of convenience, an elongated washer $d^1$ is used between each thumb screw and the frame C to project over and hold in place the clamp D.

Frames and clamps of this general character are well known and except in their relation to the other parts of my apparatus, form no part of my invention. The upper die plate E is a skeleton similar to the lower die plate, but is used in reverse position, the die members in this case projecting downward from the under surface of the die plate E, and the die members $e$ being staggered with relation to the die members $b$, these two sets of members being of sufficient length to overlap each other as shown in Fig. 3. The die plate B and the die plate E are slotted or skeletonized as shown at $B^1$, $E^1$, to allow the agent necessary for vulcanization to circulate freely through the mold and thus come into contact with substantially all the surfaces of the sheet which is in process of vulcanization.

F are nuts having handles, which screw onto the top of the bolts $A^1$ and press upon the upper die plate E, the threaded portion of each bolt being of sufficient length to allow considerable pressure to be exerted on the die members. Other means may be used to secure this pressure.

In operation a strip of rubber G is clamped in the frame C, D, the frame having holes at each end as at $C^1$, and the frame is placed on the top of the die plate B, the bolts $A^1$ passing through the holes. The upper die plate E is then put in place and the handles F are screwed down on their bolts $A^1$ so that the rubber strip G is more or less stretched as shown in Fig. 6, the die members $e$ forcing the rubber down between the die members $b$ so that the rubber is stretched over each of these members.

This having been done, the device as a whole is placed in the customary vulcanizing retort and the usual cold process of vulcanization is applied. It will be seen that the vulcanizing agent will permeate the mold both through the top passages $E^1$ and the bottom passages $B^1$ and will have an opportunity of circulating all about the rubber and in contact therewith at all points. For convenience in drawing merely, the thickness of the rubber in Fig. 6 has been exaggerated. The die members $b$, $e$ should be sufficiently far apart to allow the vulcanizing agent, which may be more or less under pressure, to reach the surfaces of the rubber sheet which lie between the two die members.

After the vulcanizing process is finished the mold is taken from the retort, and the handles F being removed and the mold being taken apart, it will be found that the material will be permanently crimped into a form depending in extent upon the overlapping of the die members $b$ and $e$. In the form of my invention shown it will be found, also, that the portion of the rubber sheet lying between the frame C and D will be of substantially the flatness and smoothness of the strip as originally placed in the mold, so that the result will be a configuration substantially as shown in Fig. 7. The crimped portion of the rubber it will be understood has been elongated or stretched in the dies, while the two borders are flat and of the original length in which the sheet was put in the mold. These margins may be cut off if so desired and leave a shirred strip, or the material before vulcanization may be clamped only at the ends if sufficiently narrow so that there will be no wide margins to be removed.

Such being the construction which I believe to be new with me, it is evident that the shape of the die members in themselves is immaterial. In other words, die members of various kinds can be utilized in an apparatus of this general character to act in like manner upon sheet rubber, and hence many different kinds of ornamental trimming or ornamentation may be produced in this way.

The form of apparatus shown in the drawings will produce such a product as is shown in Figs. 7 and 8 where G is the portion of the material held by the clamping plate C and clamp D, $g$ being the depressions caused by the die members $e$, and $g^1$ the parts of the material which have been shaped by the die members $b$. As stated above, the contour of the shirring or pattern, however it may be described, will depend upon the shape of the dies, which may be varied according to the desired result, my invention comprising a new method of ornamenting sheet rubber, which consists in stretching and fixing said sheet in whole or in part and vulcanizing it while in said stretched and fixed condition, so that the stretched portions thereof shall form a contrast with the unstretched portions, both as to thickness of texture and as to conformation.

I have shown in Fig. 9 another form of die member in which $e^1$ is a wire die in the form of a staple and attached to the die plate E in any suitable way. Such staples may be substituted for the plate form of die members shown at $b$ and $e$ with equal effect, being arranged in staggered relation to each other as in the case of the die members $b$ and $e$, and because of their skeleton form affording a freer passage for the vulcanizing agent.

I do not mean to limit myself to the form of my invention shown as it may be otherwise embodied, its purpose being to expose the greatest possible surface of stretched rubber to the vulcanizing agent, when vulcanized especially by the "cold process" so called, and thus cause it to maintain its stretched or distorted condition as a finished product. The distortions may be of any desired form depending upon the shape of the die members.

By "rubber" I mean to include rubber and its compounds and other vulcanizable material.

What I claim as my invention is:—

1. The device above described comprising a die plate having a series of die members located therein, a second die plate having a similar series of die members located therein, a sheet holding clamp adapted to hold a sheet of material therein, means for clamping said sheet-holding clamp between said die plates whereby said die members will be in staggered relation and their ends will impinge upon the sheet held by said clamp and distort it by stretching.

2. The device above described comprising a die plate having a series of die members fixedly mounted therein, and a second die plate having a similar series of die members fixedly mounted therein, a sheet-holding clamp adapted to hold a sheet of material therein, means for holding said clamp whereby the sheet held thereby will be located between said die plates to be acted upon thereby, and means for clamping said die plates together whereby said die members will be staggered relatively to each other and their ends will impinge on the sheet held by said clamp and distorted by stretching, said die plates being open top and bottom whereby gases may circulate in contact with substantially the entire surface of the distorted material.

ARTHUR J. WILLS.